US010969257B2

(12) United States Patent
Zhao et al.

(10) Patent No.: US 10,969,257 B2
(45) Date of Patent: Apr. 6, 2021

(54) ROTARY POSITION SENSOR WITH DUAL MAGNET ARRANGEMENT

(71) Applicant: HAMLIN ELECTRONICS (SUZHOU) CO. LTD., Jiangsu (CN)

(72) Inventors: Jianfei Zhao, Suzhou (CN); Wei Zhou, Suzhou (CN); Dong Liu, Suzhou (CN); Seong-Jae Lee, Suzhou (CN)

(73) Assignee: HAMLIN ELECTRONICS (SUZHOU) CO. LTD., Jiangsu (CN)

( * ) Notice: Subject to any disclaimer, the term of this patent is extended or adjusted under 35 U.S.C. 154(b) by 158 days.

(21) Appl. No.: 16/333,388

(22) PCT Filed: Sep. 23, 2016

(86) PCT No.: PCT/CN2016/099848
§ 371 (c)(1),
(2) Date: Mar. 14, 2019

(87) PCT Pub. No.: WO2018/053794
PCT Pub. Date: Mar. 29, 2018

(65) Prior Publication Data
US 2019/0250018 A1 Aug. 15, 2019

(51) Int. Cl.
*G01D 11/24* (2006.01)
*G01B 7/30* (2006.01)
(Continued)

(52) U.S. Cl.
CPC .............. *G01D 11/245* (2013.01); *G01B 7/30* (2013.01); *G01D 5/145* (2013.01); *G01D 11/24* (2013.01);
(Continued)

(58) Field of Classification Search
CPC ...... G01D 11/245; G01D 11/24; G01D 5/145; G01B 7/30; H02K 21/44; H02K 24/00; F02D 11/106; F02D 2200/602
See application file for complete search history.

(56) References Cited

U.S. PATENT DOCUMENTS 4,477,745 A    10/1984  Lux
2007/0108967 A1*  5/2007  Okuya ............... G01D 5/145
                                              324/207.2
(Continued)

FOREIGN PATENT DOCUMENTS

CN          1871500 A     11/2006
CN        101691107 A      4/2010
(Continued)

OTHER PUBLICATIONS

International Search Report from PCT/CN2016/099848 dated Jun. 27, 2017, 4 pages.
(Continued)

Primary Examiner — Christopher P McAndrew
Assistant Examiner — Zannatul Ferdous
(74) Attorney, Agent, or Firm — Kacvinsky Daisak Bluni PLLC

(57) ABSTRACT

A rotary position sensor (102) may include a sensor housing (202) defining an interior cavity. A first rotor (206) may be positioned and rotatable within the interior cavity, the first rotor (206) including a first magnet (326). Furthermore, the rotary position sensor (102) may include a second rotor (208) positioned and rotatable within the interior cavity, the second rotor (208) including a second magnet (328). The first magnet (326) may include a first shielding member (342) associated with a surface of the first magnet (326), and the second magnet (328) may include a second shielding member (344) associated with a surface of the second
(Continued)

magnet (328). The first shielding member (342) may face the second shielding member (344).

13 Claims, 5 Drawing Sheets

(51) Int. Cl.
*G01D 5/14* (2006.01)
*H02K 21/44* (2006.01)
*H02K 24/00* (2006.01)
*F02D 11/10* (2006.01)

(52) U.S. Cl.
CPC .............. *H02K 21/44* (2013.01); *H02K 24/00* (2013.01); *F02D 11/106* (2013.01); *F02D 2200/602* (2013.01)

(56) References Cited

U.S. PATENT DOCUMENTS

| | | | | |
|---|---|---|---|---|
| 2011/0184691 | A1* | 7/2011 | Mehnert | G01D 5/145 702/151 |
| 2013/0257063 | A1* | 10/2013 | Ishitsuka | B60R 25/02153 292/144 |
| 2013/0312540 | A1 | 11/2013 | Tomizawa et al. | |
| 2014/0353920 | A1* | 12/2014 | Gupta | F16J 15/3492 277/358 |
| 2016/0217894 | A1* | 7/2016 | Ausserlechner | H01F 7/0205 |
| 2016/0245674 | A1* | 8/2016 | Ausserlechner | G01D 5/12 |
| 2019/0068015 | A1* | 2/2019 | Yabe | H02K 11/215 |
| 2019/0207504 | A1* | 7/2019 | Hsu | H02K 35/06 |

FOREIGN PATENT DOCUMENTS

| | | |
|---|---|---|
| CN | 105518982 A | 4/2016 |
| DE | 22009051978 A1 | 5/2011 |
| DE | 2013001757 T5 | 2/2015 |
| EP | 1300662 A2 | 4/2003 |
| EP | 1426750 A1 | 6/2004 |
| EP | 2988101 A1 | 2/2016 |
| JP | 2006012504 A | 1/2006 |
| JP | 2015211549 A | 11/2015 |

OTHER PUBLICATIONS

Written Opinion from PCT/CN2016/099848 dated Jun. 27, 2017, 3 pages.
Extended European Search Report dated Apr. 23, 2020 for EPO application No. 16916533.9.

* cited by examiner

ROTARY POSITION SENSOR WITH DUAL MAGNET ARRANGEMENT

BACKGROUND

Field

The present disclosure generally relates to sensors. In particular, the present disclosure relates to rotary position sensors for sensing the position of controls in vehicular systems.

Description of Related Art

Rotary position sensors may be used in vehicles to sense the position of accelerator pedals, clutch pedals, brake pedals, throttle bodies, and other such controls in vehicular systems. Conventional rotary position sensors may use formed magnets to direct magnetic flux to one or more magnet-effect sensors (e.g., Hall-effect, Anisotropic Magneto-Resistive sensors, Giant magnetoresistance, and Tunnel magnetoresistance sensors) to enable position sensing of various controls in vehicular systems.

Conventional rotary position sensors are functional to sense the position of a single control in a vehicular system (e.g., a single accelerator pedal or a single brake pedal). Therefore, a single conventional rotary position sensor is not capable of providing position information related to a plurality of vehicular controls that are in close proximity. More specifically, a conventional rotary position sensor must be associated with each vehicular control (e.g., accelerator pedal, clutch pedal, and brake pedal). Therefore, there is a need to provide a rotary position sensor that is capable of providing position information associated with a plurality of vehicular controls that are in close proximity.

Other problems with existing rotary position sensors will become apparent in view of the disclosure below.

SUMMARY

This Summary is provided to introduce a selection of concepts in a simplified form further described below in the Detailed Description. This Summary is not intended to identify key or essential features of the claimed subject matter, nor is this Summary intended as an aid in determining the scope of the claimed subject matter.

According to one implementation of an apparatus, a first magnet may include a first shielding member associated with a surface of the first magnet. Furthermore, the implementation may include a second magnet including a second shielding member associated with a surface of the second magnet. A housing, such as a rotary position sensor housing, or the like, may be provided. The first and second magnets may be disposed in the housing in a side-by-side arrangement.

According to another implementation of an apparatus, a first magnet may include a first ferromagnetic shielding member associated with a surface of the first magnet. The implementation may further include a second magnet including a second ferromagnetic shielding member associated with a surface of the second magnet. A housing, such as a rotary position sensor housing, or the like, may be provided. The first and second magnets may be disposed in the housing in a side-by-side arrangement. The first and second magnets disposed in the housing in the side-by-side arrangement such that the first ferromagnetic shielding member associated with the surface of the first magnet faces the second ferromagnetic shielding member associated with the surface of the second magnet.

DETAILED DESCRIPTION

Rotary position sensors are disclosed. In one implementation, a rotary position sensor includes a sensor housing. Two rotors may be disposed in the sensor housing. Each of the two rotors may be individually rotatable within the sensor housing, and each of the two rotors may include a magnet, such as a formed magnet. Each magnet associated with the two rotors may include a ferromagnetic shield element.

A sensor, such as a magnet-effect sensor, may be disposed within the sensor housing and positioned adjacent to the magnets. In one implementation, a first magnet-effect sensor is disposed adjacent to a first magnet of the magnets and a second magnet-effect sensor is disposed adjacent to a second magnet of the magnets. The magnet-effect sensor or sensors is adapted to sense the magnitude and direction of the magnetic field associated with the first and second magnets and generate an electrical signal in response to the magnetic fields sensed by the magnet-effect sensor. The rotary position sensor is functional to provide rotation data related to an apparatus coupled to a first rotor of the rotors. In one example, the apparatus is part of a first brake pedal arm. Furthermore, the rotary position sensor is functional to provide rotation data related to a second apparatus coupled to a second rotor of the rotors. In one example, the second apparatus is part of a second brake pedal arm.

Figure 1:
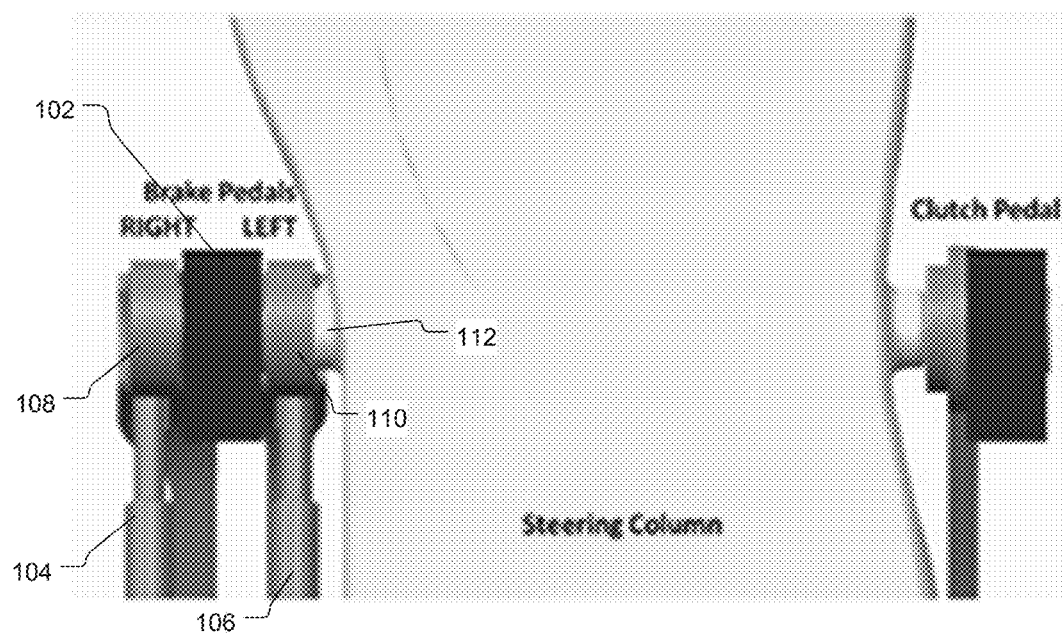
FIG. 1 illustrates an example use of a rotary position sensor that includes two rotary position sensors in one housing.

FIG. 1 illustrates an example use of a rotary position sensor 102 that includes two rotary position sensors in one housing. As is illustrated, the rotary position sensor 102 is coupled between a first brake pedal arm 104 that corresponds to a first brake pedal and a second brake pedal arm 106 that corresponds to a second brake pedal. A shaft 112 may extend at least through a bore or hole associated with the rotary position sensor 102. The first brake pedal arm 104 includes a flared brake arm portion 108 that is caused to rotate when the first brake pedal is engaged. The flared brake arm portion 108 is coupled to a first of the two rotary position sensors of the rotary position sensor 102. The second brake pedal arm 106 includes a flared brake arm portion 110 that is caused to rotate when the second brake pedal is actuated. The flared brake arm portion 110 is coupled to a second of the two rotary position sensors of the rotary position sensor 102.

Although FIG. 1 illustrates use of the rotary position sensor 102 in relation to a first brake pedal arm 104 and a second pedal arm 106, this is a non-limiting example. Specifically, the rotary position sensor 102 may be positioned between other rotatable elements, such as rotatable elements associated with clutches, throttle bodies, and the like.

Figure 2:
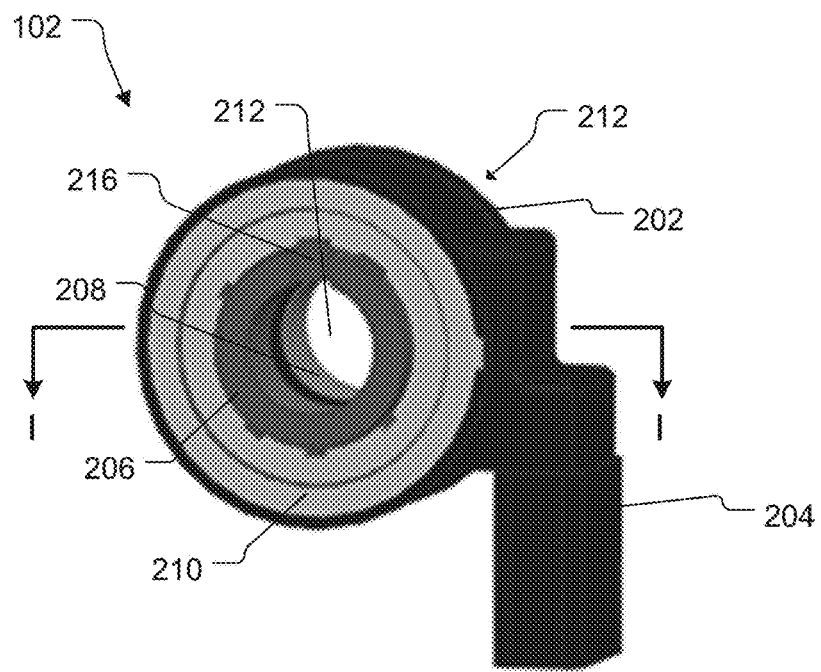
FIG. 2 illustrates a perspective view of the rotary position sensor.

FIG. 2 illustrates a perspective view of the rotary position sensor 102. The rotary position sensor 102 includes a rotary position sensor housing or sensor housing 202. The sensor housing 202 includes a plug portion 204 that enables connection of the rotary position sensor 102 to an electronic control unit or other computer or processor. The electronic control unit or other computer processor may be associated with a vehicular system, such as an automobile, agriculture or work machine, or the like.

A first rotor 206 may be disposed in the sensor housing 202. Furthermore, a second rotor 208 may be disposed within the sensor housing 202. Each of the first rotor 206 and the second rotor 208 is independently rotatable. For example, a rotatable element (e.g., the flared brake arm portion 108) may be coupled to the first rotor 206 to thereby cause rotation of the first rotor 206. Furthermore, a separate rotatable element (e.g., the flared brake arm portion 110) may be coupled to the second rotor 208 to thereby cause rotation of the second rotor 208. As is illustrated, a bore or hole 214 is defined through at least the first rotor 206 and the second rotor 208. The bore or hole 214 is to accommodate the shaft 112. The bore or hole 214 is an optional element of the rotary position sensor 102. Furthermore, a notch 216 is disposed on an exterior surface of the first rotor 206. A similar notch is also found on the second rotor 208. The notch 216 is designed to engage with a protrusion or key associated with the flared brake arm portion 108.

In one implementation, the rotary position sensor 102 includes a first cover 210 that is a positioned over at least a portion of the first rotor 206. Similarly, the rotary position sensor 102 includes a second cover 212 that is positioned over at least a portion of the second rotor 208. A view of the second cover 212 is provided in subsequent one or more figures associate with this disclosure.

Figure 3:
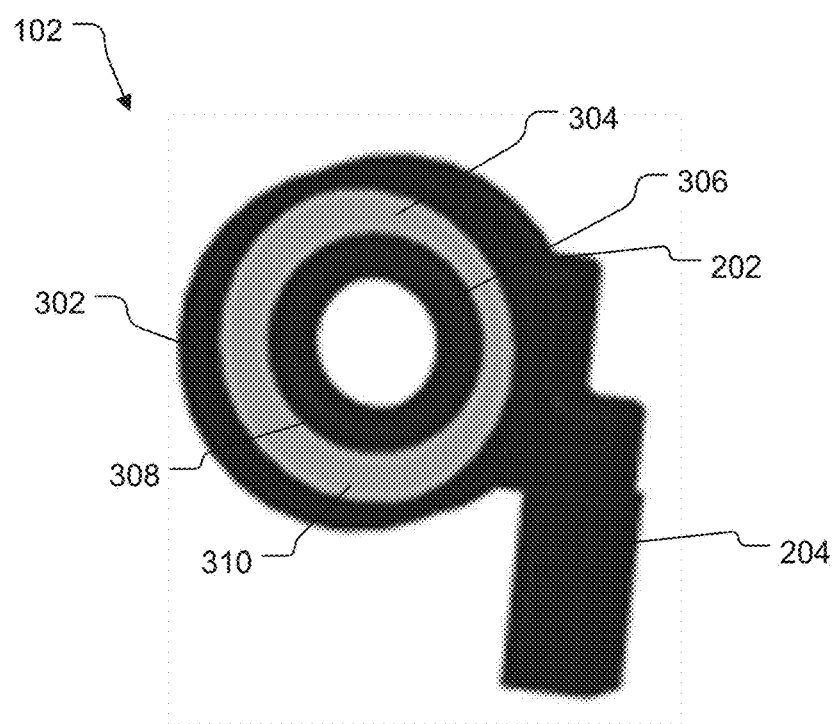
FIG. 3 illustrates another perspective view of the rotary position sensor.

FIG. 3 illustrates another perspective view of the rotary position sensor 102. In this view, the first rotor 206, the second rotor 208, the first cover 210 and the second cover 212 are not illustrated so that an interior cavity 302 of the rotary position sensor 102 is visible. As is shown, the rotary position sensor 102 includes a ring element 304 disposed within the interior cavity 302. The ring element 302 may be made of a ferromagnetic material, such as iron or the like. The ring element 302 functions to provide a magnetic field separation between the first rotor 206 and the second rotor 208. Moreover, the ring element 302 provides a dividing barrier between the first rotor 206 and the second rotor 208, to minimize friction between the first rotor 206 and the second rotor 208.

FIG. 3 further illustrates a center portion 306 that is part of the sensor housing 202. The center portion 306 engages at least a portion of an inner circumference 308 associated with the ring element 302. Furthermore, the interior cavity 302 of the sensor housing 202 engages at least a portion of an outer circumference 310 associated with the ring element 302. Therefore, the ring element 302 is held fixedly in place by the center portion 306 and the interior cavity 302 of the sensor housing 202.

Figure 4:
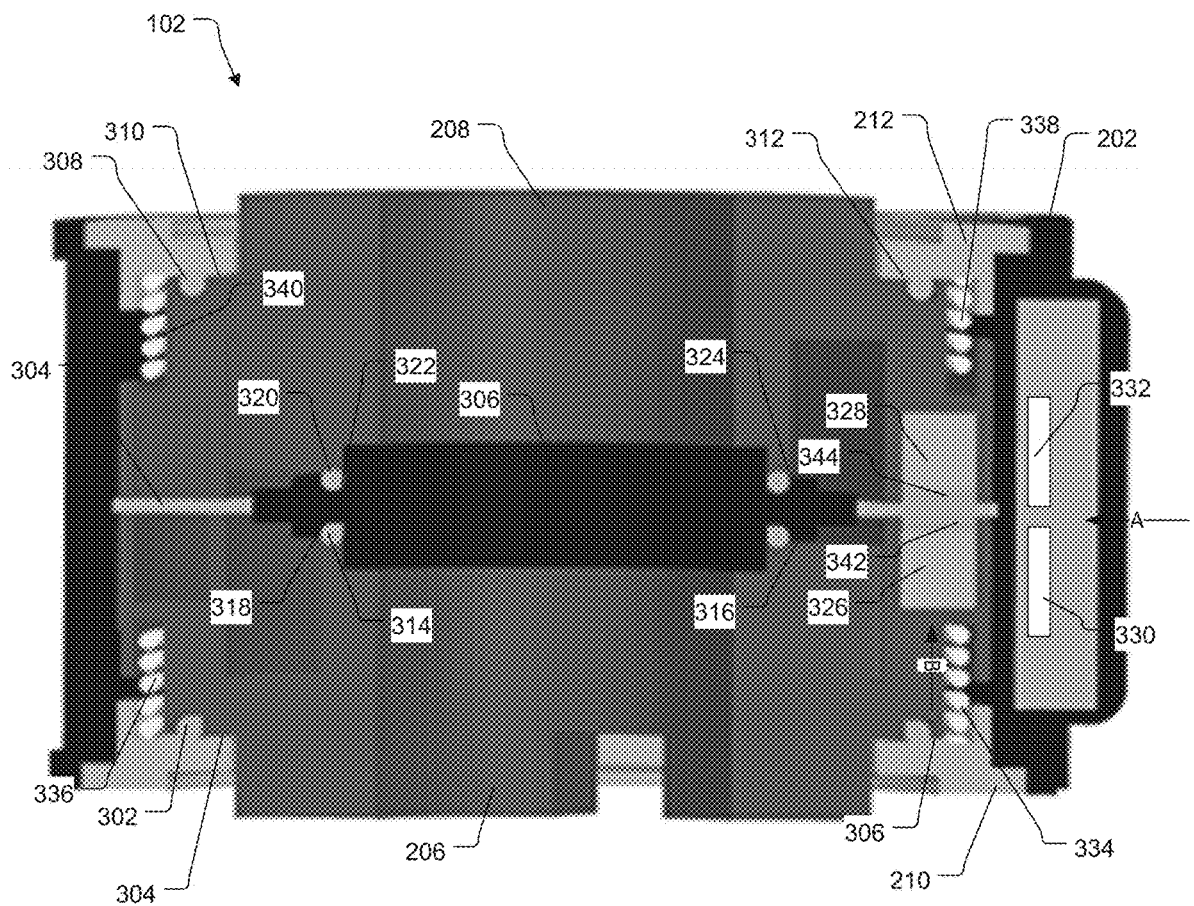
FIG. 4 illustrates a cross-section view of the rotary position sensor, as viewed from the perspective of line I-I shown in FIG. 2.

FIG. 4 illustrates a cross-section view of the rotary position sensor 102, as viewed from the perspective of line I-I shown in FIG. 2. As is illustrated, an o-ring 302, made of rubber, may be disposed on a face 304 of the first rotor 206. Therefore, the o-ring 302 is positioned between an interior surface 306 of the first cover 210 and the face 304 of the first rotor 206. The o-ring 302 is provided to mitigate against ingress of water and other external environmental elements, such as dust, chemicals, and the like. Similarly, an o-ring 308, made of rubber, may be disposed on a face 310 of the second rotor 208. Therefore, the o-ring 308 is positioned between an interior surface 312 of the second cover 212 and the face 310 of the second rotor 208. The o-ring 308 is provided to mitigate against ingress of water and other external environmental elements, such as dust, chemicals, and the like.

An o-ring 314 is disposed on a first surface 318 of the center portion 306. The o-ring 314 may be made of rubber. The o-ring 314 is positioned between the center portion 306 and an interior surface 316 of the first rotor 206. The o-ring 314 is provided to mitigate against ingress of water and other environmental elements, such as dust, chemicals, and the like. An o-ring 320 is disposed on a second surface 322 of the center portion 306. The o-ring 320 may be made of rubber. The o-ring 320 is positioned between the center portion 306 and an interior surface 324 of the second rotor 208. The o-ring 320 is provided to mitigate against ingress of water and other environmental elements, such as dust, chemicals, and the like.

A magnet 326 may be associated with the first rotor 206. The magnet 326 may be contoured or formed to the shape of the first rotor 206, or contoured or formed to a portion of the shape of the first rotor 206. A magnet 328 may be associated with the second rotor 208. The magnet 308 may be contoured or formed to the shape of the second rotor 208, or contoured or formed to a portion of the shape of the second rotor 208.

A shielding member 342 may be associated with a surface of the magnet 326. In one implementation, the shielding member 342 is coupled to the magnet 326. The shielding member 342 may be coupled to the magnet 326 using an adhesive, molding, mechanical attachment device, such as one or more fasteners, screws or clips, or the like. Additionally, a shielding member 344 may be associated with a surface of the magnet 328. In one implementation, the shielding member 342 is coupled to the magnet 328. The shielding member 344 may be coupled to the magnet 328 using an adhesive, molding, mechanical attachment device, such as one or more fasteners, screws or clips, or the like. The shielding members 342 and 344 may be made, at least partially, of ferromagnetic material, such as iron or the like.

As is illustrated in FIG. 4, the shielding member 342 may face the shielding member 344. The shielding member 342 is used to substantially isolate the magnetic field associated the magnet 326, so that the magnetic field does not interfere with the magnetic field associated with the magnet 328. Similarly, the shielding member 344 is used to substantially isolate the magnetic field associated the magnet 328, so that the magnetic field does not interfere with the magnetic field associated with the magnet 326.

Magnetic field sensors 330 and 332 may be housed within the sensor housing 202. In an alternative embodiment, in the place of the magnetic field sensors 330 and 332, a single magnetic field sensor may be housed within the sensor housing 202. The magnetic field sensors 330 and 332 may be magnet-effect sensors (e.g., Hall-effect, Anisotropic Magneto-Resistive sensors, Giant magnetoresistance, and Tunnel magnetoresistance sensors).

The magnetic field sensor 330 produces an electrical output signal that changes in response to the position of the magnet 326. The position of the magnet 326 will change as the rotor 206 is rotated. As the magnetic field (i.e., magnitude/strength and polarity/direction) generated by the magnet 326 varies with rotation the rotor 206, the electrical output signal produced by the magnetic field sensor 330 changes accordingly, thus allowing the position the rotor 206 to be determined or ascertained and accordingly the position of flared brake arm portion 108 coupled to the rotor 206 to be determined or ascertained. The magnetic field sensor 330 senses the changing magnetic field (i.e., magnitude/strength and polarity/direction) as the magnet 326 is rotated. In one embodiment, the electrical signal produced by the magnetic field sensor 330 is proportional to the position of the flared brake arm portion 108.

Similarly, the magnetic field sensor 332 produces an electrical output signal that changes in response to the position of the magnet 328. The position of the magnet 328 will change as the rotor 208 is rotated. As the magnetic field (i.e., magnitude/strength and polarity/direction) generated by the magnet 328 varies with rotation the rotor 208, the electrical output signal produced by the magnetic field sensor 332 changes accordingly, thus allowing the position the rotor 208 to be determined or ascertained and accordingly the position of flared brake arm portion 110 coupled to the rotor 208 to be determined or ascertained. The magnetic field sensor 332 senses the changing magnetic field (i.e., magnitude/strength and polarity/direction) as the magnet 328 is rotated. In one embodiment, the electrical signal produced by the magnetic field sensor 332 is proportional to the position of the flared brake arm portion 110.

As further illustrated in FIG. 4, a spring 334 is disposed in a slot 336 defined by the first rotor 206 and the first cover 210. The spring 334 is functional to bias the first rotor 206 to a predetermined initial position. Furthermore, a spring 338 is disposed in a slot 340 defined by the second rotor 208 and the first cover 212. The spring 3 and 38 is functional to bias the first rotor 208 to a predetermined initial position.

Figure 5:
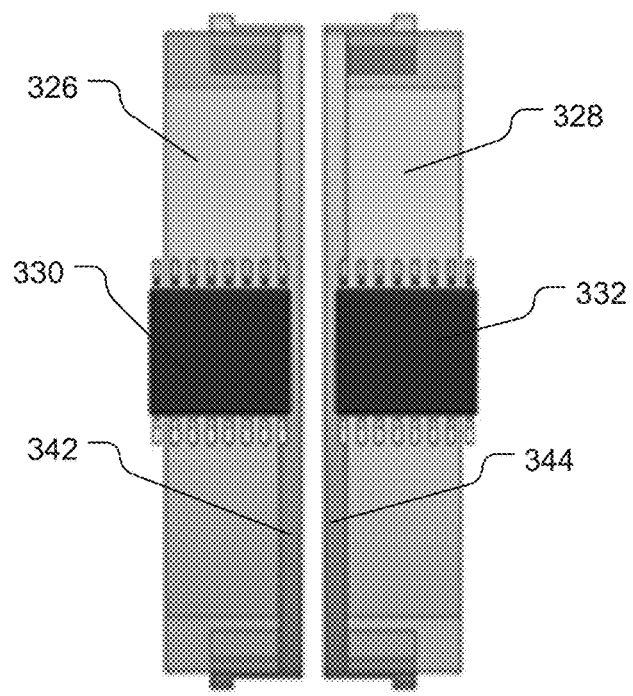
FIG. 5 illustrates a first view of magnets and magnet-effect sensors from the perspective of arrow-line A shown in FIG. 4.

FIG. 5 illustrates a first view of the magnets 326 and 328 and the magnet-effect sensors 330 and 332, from the perspective of arrow-line A shown in FIG. 4. The rotary position sensor housing 202, and related elements therein, are not illustrated in FIG. 5. As shown, the shielding member 342 faces the shielding member 344. In one implementation, at least a portion of the ring element 304 may be disposed between the shielding member 342 and the shielding member 344. In another implementation, the ring element 304 does not extend between the shielding member 342 and the shielding member 344.

Figure 6:
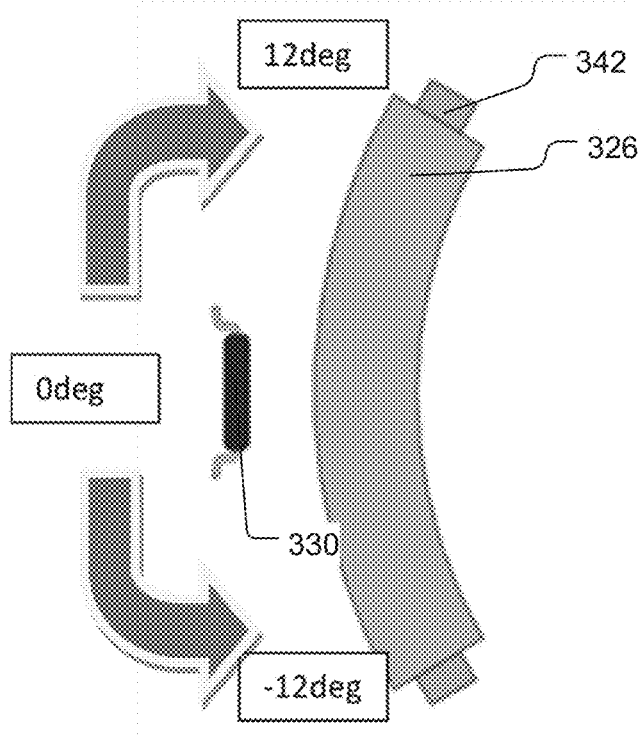
FIG. 6 illustrates a second view of the magnets and the magnet-effect sensors, from the perspective of arrow-line B shown in FIG. 4.

FIG. 6 illustrates a second view of the magnet 326 and the magnet-effect sensor 330, from the perspective of arrow-line B shown in FIG. 4. The rotary position sensor housing 202, and related elements therein, are not illustrated in FIG. 6. The view from the perspective of arrow-line B does not provide a view of the magnet 328 and the magnet-effect sensor 332. However, it should be understood that the magnet 328 is positioned substantially adjacent to the magnet 326, and the magnet-effect sensor 332 is positioned substantially adjacent to the magnet-effect sensor 330. The arrows provided in FIG. 6 show that the magnets 326 and 328 may be individually rotated from 0° to positive 12° and/or from 0° to negative 12°. However, the illustrated range of rotation associated with the magnets 326 and 328 is merely exemplary.

Figure 7:
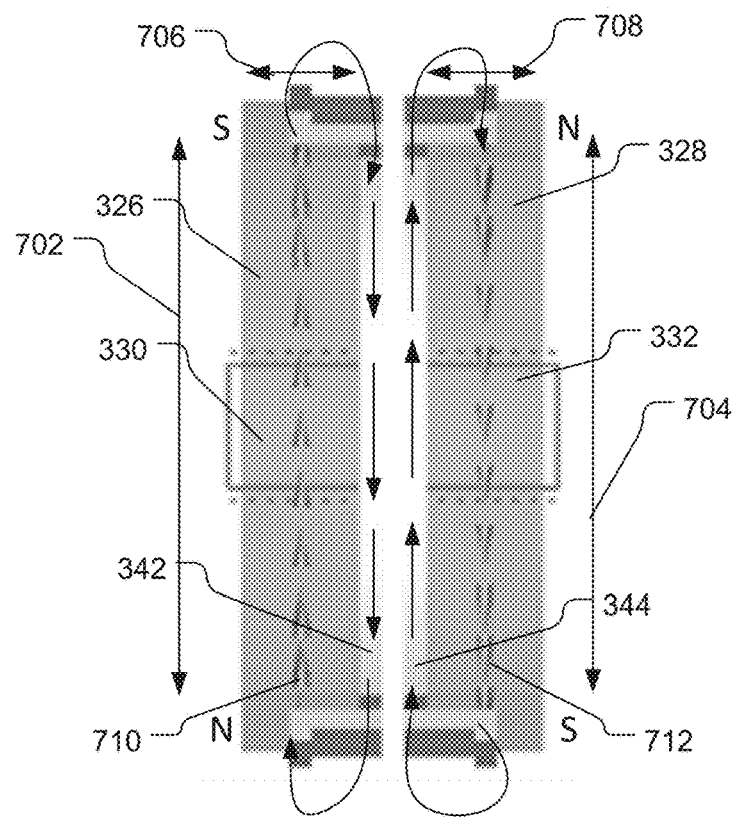
FIG. 7 illustrates another view of the magnets and the magnet-effect sensors, from the perspective of arrow-line A shown in FIG. 4.

FIG. 7 illustrates another view of the magnets 326 and 328 and the magnet-effect sensors 330 and 332, from the perspective of arrow-line A shown in FIG. 4. The rotary position sensor housing 202, and related elements therein, are not illustrated in FIG. 7. The magnet 326 has a length 702 along a first surface thereof. Similarly, the magnet 328 has a length 704 along a first surface thereof. The magnet 326 also has a length 706 along a second surface thereof. Similarly, the magnet 328 has a length 708 along a second surface thereof. The length 702 may be greater than the length 706. In addition, the length 704 may be greater than the length 708.

The magnetic poles of the magnets 326 and 328 are also illustrated in FIG. 7. The magnets 326 and 328 are shown having particular magnetic properties. In one implementation, the magnets 326 and 328 are positioned in a side-by-side arrangement such that the north pole of the magnet 326 is opposite from the north pole of the magnet 328. More particularly, in one implementation, the magnet 326 is oriented so that the south pole is at the top and the north pole is at the bottom, and the magnet 328 is oriented so that the north pole is at the top and the south pole is at the bottom. In an alternative implementation, the magnet 326 is oriented so that the north pole is at the top and the south pole is at the bottom, and the magnet 328 is oriented so that the south pole is at the top and the north pole is at the bottom.

The magnetic fields/flux lines associated with the magnets 326 and 328 are also illustrated in FIG. 7. Regarding magnet 326, a magnetic field 710 is oriented in a direction from the north pole to the south pole. The flux lines associated with the magnetic field 710 are attracted to the shielding element 342. In other words, the shielding element 342 draws the flux lines associated with the magnetic field 710 away from the magnet 328. Regarding magnet 328, a magnetic field 712 is oriented in a direction from the north pole to the south pole. The flux lines associated with the magnetic field 712 are attracted to the shielding element 344. In other words, the shielding element 344 draws the flux lines associated with the magnetic field 712 away from the magnet 328.

Figure 8:
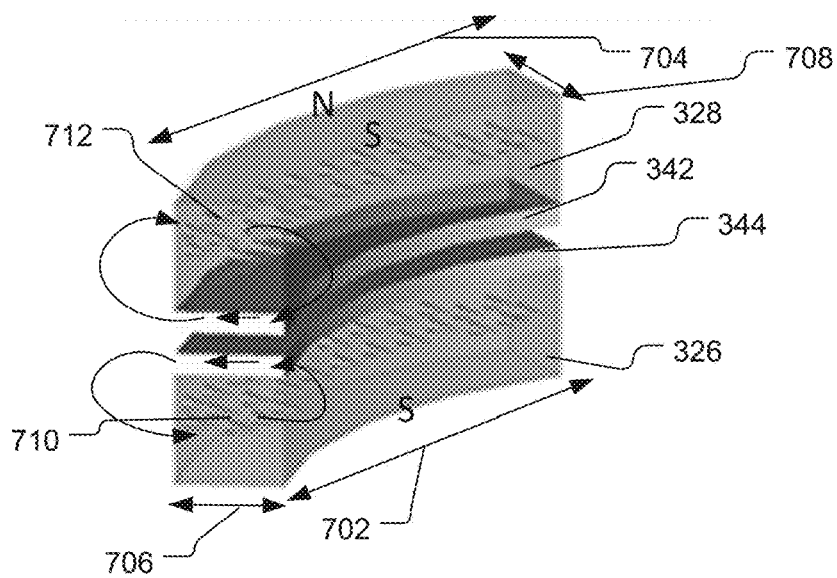
FIG. 8 illustrates yet another view of the magnets.

FIG. 8 illustrates another view of the magnets 326 and 328. The magnets 326 and 328 are shown having particular magnetic properties, which are different than the particular magnetic properties of the magnets 326 and 328 illustrated in FIG. 7. Specifically, the magnetic poles of the magnets 326 and 328 illustrated in FIG. 8 are different than the magnetic poles of the magnets 326 and 328 illustrated in FIG. 7. The magnet 326 has a length 702 along a first surface thereof. Similarly, the magnet 328 has a length 704 long a first surface thereof. The magnet 326 also has a length 706 along a second surface thereof Similarly, the magnet 328 has a length 708 second surface thereof. The length 702 may be greater than the length 706. In addition, the length 704 may be greater than the length 708.

The magnetic poles of the magnets 326 and 328 are also illustrated in FIG. 8. In one implementation, the magnets 326 and 328 are positioned in a side-by-side arrangement such that the north pole of the magnet 326 is adjacent to the north pole of the magnet 328. In other words, the magnets 326 and 328 are positioned in a side-by-side arrangement such that their magnetic poles are oriented in the same direction.

The magnetic fields/flux lines associated with the magnets 326 and 328 are also illustrated in FIG. 8. Regarding magnet 326, a magnetic field 710 is oriented in a direction from the north pole to the south pole. The flux lines associated with the magnetic field 710 are attracted to the shielding element 342. In other words, the shielding element 342 draws the flux lines associated with the magnetic field 710 away from the magnet 328. Regarding magnet 328, a magnetic field 712 is oriented in a direction from the north pole to the south pole. The flux lines associated with the magnetic field 712 are attracted to the shielding element 344. In other words, the shielding element 344 draws the flux lines associated with the magnetic field 712 away from the magnet 328.

While exemplary rotary position sensors and magnets are disclosed, it will be understood by those skilled in the art that various changes may be made and equivalents may be substituted without departing from the spirit and scope of the claims of the application. Other modifications may be made to adapt a particular situation or material to the teachings disclosed above without departing from the scope of the claims. Therefore, the claims should not be construed as being limited to any one of the particular embodiments disclosed, but to any embodiments that fall within the scope of the claims.

We claim:

1. An apparatus, comprising:
   a first magnet including a first shielding member associated with a surface of the first magnet;
   a second magnet including a second shielding member associated with a surface of the second magnet;
   a housing, the first and second magnets disposed in the housing in a side-by-side arrangement, wherein the housing is a rotary position sensor housing, and the apparatus further comprises:
     a first rotor disposed in the rotary position sensor housing, the first rotor individually rotatable in the rotary position sensor housing, and the first magnet disposed in the first rotor; and
     a second rotor disposed in the rotary position sensor housing, the second rotor individually rotatable in the rotary position sensor housing, and the second magnet disposed in the second rotor; and
   first and second springs disposed in the rotary position sensor housing, the first spring coupled to the rotary position sensor housing and positioned between the rotary position sensor housing and the first rotor and the second spring coupled to the rotary position sensor housing and positioned between the rotary housing and the second rotor.

2. The apparatus according to claim 1, further comprising a ring element disposed in the rotary position sensor housing, the ring element arranged between the first rotor and the second rotor.

3. The apparatus according to claim 2, wherein the ring element comprises a ferromagnetic material.

4. The apparatus according to claim 1, further comprising a first magnet-effect sensor positioned adjacent to the first magnet and a second magnet-effect sensor positioned adjacent to the second magnet.

5. The apparatus according to claim 1, further comprising a first cover positioned over at least a portion of the first rotor disposed in the rotary position sensor housing and a compliant o-ring disposed between the first cover and the first rotor.

6. The apparatus according to claim 5, further comprising a second cover positioned over at least a portion of the second rotor disposed in the rotary position sensor housing and another compliant o-ring disposed between the second cover and the second rotor.

7. The apparatus according to claim 1, wherein the first shielding member and the second shielding member are made of at least a ferromagnetic material.

8. The apparatus according to claim 1, wherein the first shielding member is coupled to the surface of the first magnet and the second shielding member is coupled to the surface of the second magnet.

9. The apparatus according to claim 1, wherein the first magnet and the second magnet are individually rotatable in the housing.

10. The apparatus according to claim 1, wherein the first magnet has a first surface that has a length greater than a length of a second surface of the first magnet, a first magnetic pole associated with a first end of the first surface of the first magnet and a second magnetic pole associated with a second end of the first surface of the first magnet, and further wherein the second magnet has a first surface that has a length greater than a length of the second surface of the second magnet, a first magnetic pole associated with the first end of the first surface of the second magnet and a second magnetic pole associated with a second end of the first surface of the second magnet.

11. The apparatus according to claim 1, wherein the first magnet has a first surface that has a length greater than a length of a second surface of the first magnet, a first magnetic pole associated with a first end of the second surface of the first magnet and a second magnetic pole associated with a second end of the second surface of the first magnet, and further wherein the second magnet has a first surface that has a length greater than a length of the second surface of the second magnet, a first magnetic pole associated with the first end of the second surface of the second magnet and a second magnetic pole associated with a second end of the second surface of the second magnet.

12. The apparatus according to claim 1, wherein the first and second magnets are positioned in the side-by-side arrangement such that a north pole of the first magnet is oriented opposite from a north pole of the second magnet.

13. The apparatus according to claim 1, wherein the first and second magnets are positioned in the side-by-side arrangement such that a north pole of the first magnet is oriented in a same direction as a north pole of the second magnet.

* * * * *